United States Patent Office 3,523,825
Patented Aug. 11, 1970

3,523,825
CLEANING COMPOSITION AND
METHOD OF USING SAME
Joseph W. Callahan and Eric G. Marque, Maplewood, La., assignors to Chemical Cleaning and Equipment Service, Inc., a corporation of Texas
No Drawing. Filed Apr. 7, 1967, Ser. No. 629,109
Int. Cl. C23g 1/02; C02b 5/02
U.S. Cl. 134—2          9 Claims

ABSTRACT OF THE DISCLOSURE

A cleaning composition and method of using same for the removal of polymer, coke, coke-like, and other foulants which are produced in such equipment as boilers, towers, process lines, reactors, and heat exchangers in the course of processing in refineries and petrochemical plants.

BACKGROUND OF THE INVENTION

This invention is in the field of chemical cleaning compositions and methods of using same. In the past, the cleaning of process equipment has been attempted with various materials such as high pressure water, water and abrasive, acids, alkalies, and combination cleaners. With all of such prior art chemicals and procedures, the equipment down-time has been execessive, and the cleaning procedures have been only partially complete. In fact, the residue remaining in the equipment after such prior art cleaning provided a "seed" or base which encouraged or promoted the deposition or accumulation of new soil and other foulants. In addition, the problems of removal of foulants is accentuated by the fact that the process equipment has often included aluminum, mild steel, cast iron, and other metals subject to excessive corrosion with many cleaning compositions.

SUMMARY OF THE INVENTION

The present invention solves the problems of the prior art by providing a chemical composition and method of using same which effectively removes foulants, including polymers, cokes, and coke-like materials from process equipment and the like in a relatively short time and with a minimum of corrosion of the metal of the equipment. In particular, the cleaning composition of the present invention is capable of rapidly removing polymerized butadiene and undesired cross-linked polymers as well as cokes and coke-like foulants such as are often produced from organic products at high temperatures of 350° F. and higher.

An object of this invention is to provide a new and improved cleaning composition and method of using same wherein foulants are removed in a minimum of down-time and with a minimum of corrosion of the equipment being cleaned.

Other objects of the invention will become evident hereinafter.

DESCRIPTION OF THE PREFERRED EMBODIMENTS

The chemical composition of the present invention, and the method of using same, are utilized for removing various types of foulants or deposits, and particularly those found in the process equipment in refineries and petrochemical plants. For example, the cleaning composition of the present invention is particularly suitable for removing carbon or coke, as well as carbon or coke compound deposits. In addition, the cleaning composition of the present invention is suitable for removing polymer, normally of the undesirable polymerized type, such as improperly cross-linked polyethylene, butadiene, furfural, and other organic polymers. In some instances, polymers and carbon are mixed together as a foulant or deposit in the process equipment, and such mixtures may likewise be removed with the chemical composition of the present invention. The foulants referred to above are often found in various chemical lines, pipes, heat exchangers, reactors, boilers, towers, and other types of process equipment.

Such process equipment may be formed of various metals, but commonly the process equipment is formed of mild steel, cast iron, alloys such as 70–30 copper-nickel alloy, stainless steels of various grades such as "410," "304," and "316," Monel, admiralty brass, red brass, and aluminum. It is important to note that the present invention is capable of cleaning the foulant from such metals with a minimum of corrosion of the metals, and in a minimum of time for the cleaning operation. For example, with the chemical composition of the present invention, foulants can be cleaned from aluminum with about one-third of the corrosion which is caused by the use of inhibited hydrochloric acid. It is also known that aluminum is the metal most subject to corrosion by the various acids used in the cleaning procedures. Therefore, the other metals listed above would have substantially less corrosion than the aluminum when using the cleaning composition of the present invention for cleaning foulants therefrom.

In the preferred embodiment of the present invention, the cleaning composition includes: 92% by weight of concentrated sulfuric acid; 6% by weight of concentrated nitric acid; and 2% by weight of flake chromic acid. In such specific example, the concentrated sulfuric acid is a 98% solution, and the concentrated nitric acid is a 70% solution. Thus, there is a minimum of water present in the composition.

Considering the invention more broadly, it has been found that the chemical composition of the present invention may have the following constituents for effective cleaning with a minimum of corrosion of the metal being cleaned:

Nitric acid—about 1% to about 12% by weight
Chromic acid—about 1% to about 4% by weight
Water (including that present in the other constituents)—a maximum of 20% by weight
Sulfuric acid—the balance up to 100%

In the above example, the nitric acid and sulfuric acid are both in concentrated form, although the extent of the concentration may vary so long as the total water content of the total composition does not exceed about 20% by weight. So long as the chemical composition of the present invention is provided with the chemical constituents set forth in the ranges specified above, the various metals which are cleaned are substantially unaffected, while at the same time the foulants are completely, or substantially completely, removed.

Although the time for the removal of the foulants will vary depending upon the thickness of the foulant coating and to some extent upon the particular foulant being removed, it has been found that in typical situations, the chemical composition of the present invention may accomplish the effective removal of the foulants in as short a time as eight hours, or even less. In the past, the removal or cleaning of the foulants which are removed by the present cleaning composition was virtually impossible, and even when attempted, the treatment by the prior art procedures required extended periods of time in the magnitude of several weeks for even a partial cleaning.

The method of using the chemical composition of the present invention for cleaning process equipment and other similar metal surfaces is relatively simple due to the highly effective cleaning action of the cleaning composition of the present invention. The equipment to be cleaned is detached from the other equipment with which it is connected so that the cleaning composition of the present invention may be circulated through the equipment to be cleaned. Such detachment of the equipment to be cleaned is conventional and may normally be readily accomplished. Thereafter, the cleaning composition of the present invention is pumped into the process equipment to be cleaned and circulation is maintained for a predetermined period of time. In some instances, it is necessary to heat the cleaning composition to a temperature in the neighborhood of 240° F. to 250° F. to catalyze the reaction of the cleaning composition and the foulant, depending largely upon the particular foulants being removed. In any event, the reaction between the cleaning composition and the foulant generally improves when the temperature is above 230° F. If the reaction between the cleaning composition and foulant requires heat, steam may be introduced on the outside of the metal being treated so as to provide the necessary heat. For example, in a boiler or reboiler, the steam may be introduced on the shell side so as to maintain a temperature in the neighborhood of 190° F. while the cleaning composition is circulated for a predetermined time, generally about eight hours. After such period of circulation, the cleaning composition is drained from the equipment, water is circulated through the equipment, and then an inhibitor solution is flushed through the equipment to remove the residual cleaning composition from the equipment.

The flushing of the equipment may also include a flushing with a neutralizing solution such as an alkali, a typical one being soda ash. Then, after a circulation with such neutralizing solution for a predetermined time, for example, one hour, the alkali and water are drained from the equipment. A final flushing with plain water may be conducted until the effluent is clear. The equipment is then ready for reconnection to the system from which it was detached, since it is completely clean and has none of the foulant present which might otherwise provide a seed or base for subsequent redeposition of other foulants. Therefore, the cleaning composition of the present invention and the method of using same results in a cleaned surface or surfaces in the equipment so that the equipment may be then used for longer periods of time prior to cleaning again than would be possible with the partially complete cleaning procedures heretofore known and used.

In some instances, the nature of the foulants is such that they react with the chemical composition to produce an exothermic reaction so that the reaction itself supplies its own heat. If the heat becomes excessive, cooling may be required so that the temperature or other reaction is controlled, preferably below about 300° F.

It should be understood that although the invention has been described herein for use in a circulation cleaning procedure, it may also be used in a hot vat cleaning operation or batch process if desired. Although the invention has been described for use with particular foulants and under particular conditions by way of example it will be understood by those skilled in the art that the invention may have other applications which will now become evident to those skilled in the art.

We claim:
1. A cleaning composition suitable for cleaning foulants such as polymers, cokes, and coke-like materials from process equipment with a minimum of corrosion and within a minimum of time, comprising:
   (a) concentrated nitric acid in an amount of at least 1% by weight;
   (b) chromic acid in an amount of at least about 1% by weight;
   (c) water, including that present in the other constituents, in an amount less than 20% by weight; and
   (d) concentrated sulfuric acid to make the balance to 100%.
2. The composition set forth in claim 1, wherein:
   (a) said concentrated nitric acid is present in an amount within a range from about 1% to about 12% by weight;
   (b) said chromic acid is present in an amount within a range of from about 1% to about 4% by weight; and
   (c) said sulfuric acid is present in an amount which together with the water makes up the total weight of the composition.
3. The composition set forth in claim 1, wherein:
   (a) said concentrated nitric acid is present in an amount of about 6% by weight;
   (b) said chromic acid is present in an amount of about 2% by weight; and
   (c) said concentrated sulfuric acid is present in an amount of about 92% by weight.
4. The composition set forth in claim 1, wherein:
   (a) said concentrated nitric acid is about 70% concentrated and is present in an amount of about 6% by weight;
   (b) said chromic is in flake form and is present in an amount of about 2% by weight; and
   (c) said concentrated sulfuric acid is about 98% concentrated and is persent in an amount of about 92% by weight.
5. A method of cleaning process equipment, comprising:
   (a) introducing into equipment to be cleaned a composition comprising:
      (1) concentrated nitric acid in an amount of at least 1% by weight;
      (2) chromic acid in an amount of at least about 1% by weight;
      (3) water, including that present in the other constituents, in an amount less than 20% by weight; and
      (4) concentrated sulfuric acid to make the balance to 100%.
6. The method of claim 5, including:
   (a) controlling the temperature of said composition so as to be above about 230° F. to catalyze the reaction between the composition and the foulant.
7. The method of claim 5, including:
   (a) circulating said composition in said equipment for a predetermined time
   (b) then removing said composition from the equipment; and
   (c) thereafter flushing the equipment with inhibitor solution.
8. The method of claim 5, including:
   (a) circulating said composition in said equipment for a predetermined time

(b) then removing said composition from the equipment; and
(c) thereafter flushing the equipment with water and mild alkali.

9. The method of claim 5, wherein:
(a) the equipment to be cleaned is a metal selected from the group consisting of mild steel, cast iron, copper-nickel alloy, stainless steel, Monel, admiralty brass, red brass, and aluminum; and
(b) the cleaning is effected with substantially no corrosion of the metal of said equipment.

References Cited

UNITED STATES PATENTS

| | | | |
|---|---|---|---|
| 2,172,041 | 9/1939 | Urban | 134—3 |
| 2,337,062 | 12/1943 | Page | 134—3 |
| 2,453,429 | 11/1948 | Gorman | 252—142 |
| 2,762,728 | 9/1956 | Hahn | 252—142 |
| 2,872,302 | 2/1959 | Bulan | 252—142 |
| 3,003,896 | 10/1961 | Kendall | 252—142 |

OTHER REFERENCES

Betz Handbook of Industrial Water Conditioning, Betz Laboratories, 1962, pp. 224–226.

LEON D. ROSDOL, Primary Examiner

I. GLUCK, Assistant Examiner

U.S. Cl. X.R.

134—3, 27, 28, 29, 41; 252—142; 21—2.7; 201—2; 210—60